UNITED STATES PATENT OFFICE.

JOHANN BILLWILLER, OF GOLDACH, NEAR ROHRSCHACH, SWITZERLAND.

ARTIFICIAL STONE.

1,129,060.     Specification of Letters Patent.     Patented Feb. 23, 1915.

No Drawing.     Application filed May 18, 1912. Serial No. 698,238.

*To all whom it may concern:*

Be it known that I, Dr. JOHANN BILLWILLER, a citizen of Switzerland, and residing at Goldach, near Rohrschach, Switzerland, have invented certain new and useful Improvements in Artificial Stone, of which the following is a specification.

It is known to treat caustic magnesia and burnt lime with water-glass, sodium or potassium silicate. In both cases quick-setting crumbling substances, heating greatly in setting are obtained, which cannot be easily molded any further. As the inventor has found, a uniformly setting, plastic and conveniently treated mortar is produced, if moderately burnt dolomite, in which only the magnesia has been freed of the carbon dioxid, is mixed with a solution of water-glass. Such burnt dolomite has indeed been already used as a slightly hydraulic mortar component, and been mixed with water, but not with a solution of water-glass. The artificial stones made according to the dolomite magnesia form very strong bodies, are dense and can be washed.

In practice it will be difficult to burn dolomite just to such a degree, that only the carbonate of magnesia is disintegrated and not also a part of the carbon dioxid in the carbonate of lime is separated from the latter. Nevertheless small quantities of burnt lime will do no harm. But if more than five per cent. are present a rapid setting will result and the volumetric permanency is impaired. It has furthermore been ascertained that these disadvantages can be removed by the lime being hydrated.

The invention therefore also relates to a method of rendering too highly burnt dolomite containing caustic lime by a dry slaking process treatable with water-glass. The surprising discovery was made, that the thus obtained mortar is by far more plastic. By this previous slaking the hardening property is not reduced.

An addition of gypsum will have a favorable influence on the hardening of the moderately burnt dolomite with water-glass or magnesium chlorid, and also a small addition of clay proved of a highly improving effect.

The said substances are particularly adapted for binding fibrous substances or highly porous materials such as saw dust, asbestos, cork meal, with which it is impossible to obtain with Sorel cement products which are permanently proof against swelling. They are furthermore well suited for coating front walls.

I claim:

1. The method of making volumetrically permanent artificial stone, which comprises removing carbon dioxid from the magnesia content of dolomite and treating the resultant product with water glass.

2. A method of making volumetrically permanent artificial stone compounds, which comprises treating incompletely burnt dolomite in which the carbon dioxid has been removed from the magnesia, with water-glass, the burnt dolomite being submitted to a preliminary slaking with water to slake its lime content.

3. A method of making volumetrically permanent artificial stone compounds, which comprises treating incompletely burnt dolomite in which the carbon dioxid has been removed from the magnesia, with water-glass, the burnt dolomite being submitted to a preliminary slaking with water to slake its lime content, whereupon an addition of gypsum is made.

4. A method of making volumetrically permanent artificial stone compounds, which comprises treating incompletely burnt dolomite in which the carbon dioxid has been removed from the magnesia, with water-glass, the burnt dolomite being submitted to a preliminary slaking with water to slake its lime content, whereupon an addition of gypsum and a small quantity of clay is made.

In testimony whereof I hereto affix my signature in presence of two witnesses.

DR. JOHANN BILLWILLER.

Witnesses:
  Dr. Med. ULLMANN,
  D. KONN.

Copies of this patent may be obtained for five cents each, by addressing the "Commissioner of Patents, Washington, D. C."